United States Patent [19]
Kato

[11] Patent Number: 5,879,766
[45] Date of Patent: Mar. 9, 1999

[54] CERAMIC JOINT BODY AND PROCESS FOR MANUFACTURING THE SAME

[75] Inventor: Shigeki Kato, Nagoya, Japan

[73] Assignee: NGK Insulators, Ltd., Japan

[21] Appl. No.: 904,306

[22] Filed: Jul. 31, 1997

[30] Foreign Application Priority Data

Aug. 5, 1996 [JP] Japan ..................................... 8-205965

[51] Int. Cl.$^6$ .................................................. F16B 1/00
[52] U.S. Cl. ...................... 428/34.4; 428/34.1; 403/179; 403/242; 403/404; 285/911
[58] Field of Search ................. 428/34.4, 34.1; 403/273, 242, 179, 404; 285/911

[56] References Cited

U.S. PATENT DOCUMENTS

| | | | |
|---|---|---|---|
| 3,905,173 | 9/1975 | Gerken | 403/242 |
| 4,297,779 | 11/1981 | Melten et al. | 403/273 |
| 4,370,081 | 1/1983 | Briles | 403/404 |
| 4,806,040 | 2/1989 | Gill et al. | 403/404 |
| 4,886,695 | 12/1989 | Mizuno et al. | 403/273 |
| 5,287,613 | 2/1994 | Dahl | 403/273 |
| 5,299,881 | 4/1994 | Mettlet-Friedli | 403/273 |
| 5,462,381 | 10/1995 | De Wachter et al. | 403/404 |

FOREIGN PATENT DOCUMENTS 0 479 657 A1   4/1992   European Pat. Off. .
2 210 363      6/1989   United Kingdom .

*Primary Examiner*—Rena L. Dye
*Attorney, Agent, or Firm*—Parkhurst & Wendel, L.L.P

[57] ABSTRACT

A joint body containing a ceramic member composed of a main body and a disclike projection projected therefrom and a ceramic cylindrical body. The disclike projection is inserted inside the cylindrical body, and a relative density of the disclike projection is higher than that of the cylindrical body. The cylindrical body is composed of a straight portion not contacted with the projection and having a uniform inside diameter, a diameter-expanded portion in contact with the projection and having the largest inner diameter, and a tapered connecting portion bridging the straight portion and diameter-expanded portion. A difference between the inner diameter of the straight portion and that of the diameter-expanded portion is 0.05 mm to 0.6 mm.

1 Claim, 2 Drawing Sheets

FIG_1

CERAMIC JOINT BODY AND PROCESS FOR MANUFACTURING THE SAME

BACKGROUND OF THE INVENTION

1. Field of the Invention

The present invention relates to a joint body comprising a ceramic member composed of a main body and a projection projected therefrom and a ceramic cylindrical body, and a process for manufacturing the same.

2. Description of Related Art

The present inventors have disclosed a ceramic heater of a specific structure as a heating device for use in a thermal CVD apparatus for producing semiconductors, for example, in the specification of Japanese patent application 301,897/ 1991. For manufacturing such ceramic heaters, it has become necessary to join a disc-shaped substrate made of silicon nitride ceramic with a tungsten resistor embedded therein and a cylindrical member made of silicon nitride. However, the inventors have found it difficult to join such ceramic members each other in high strength.

For example, the inventors tried to join the above-mentioned disc-shaped substrate with a cylindrical member with an oxide glass, however, it was found that a mechanical strength at a joint portion was low. Moreover, when a heating device comprising such a joint body was placed in an apparatus for producing semiconductors and corrosive gases or gases for forming a semiconductor membrane were fed into the apparatus, there was a possibility of gas leakage from joint portions between the aforementioned disc-shaped substrate and the cylindrical member. Additionally, there are also a possibility of forming cracks at the joint portions during using the heating device repeatedly.

Further, the inventors applied a brazing material between an aluminum nitride member and a ceramic member, and tried to join both the members by heating the brazing material. However, it was found that the joint strength was low, because most of the brazing materials, though they joined well to metal members, hardly wetted the aluminum nitride members, so that they could not join to aluminum nitride members due to poor adhesion or growth of fine gaps. Moreover, when the joint body was placed in the apparatus for producing the semiconductors, the joint body comprising the aluminum nitride members was necessarily exposed to a halogenous corrosive gas atmosphere, particularly to a plasma atmosphere. However, in this case, the corrosive gas entered inside the joint body from the joint portion and deteriorated the joint layer with the consequence that the joint strength of the aluminum nitride joint body was lowered.

SUMMARY OF THE INVENTION

It is, therefore, an object of the present invention to provide a joint structure which maintains a mechanical strength and airtightness at the joint portion, particulary when heat cycle is applied between high and low temperatures, even in ceramics such as aluminum nitride which are hardly wetted and joined by usual joining materials.

According to the first aspect of the invention, there is the provision of a ceramic joint body comprising a ceramic member composed of a main body and a projection projected therefrom and a ceramic cylindrical body, wherein the projection is inserted into the cylindrical body, said projection having a relative density larger than that of the cylindrical body, said cylindrical body comprising a straight cylindrical portion having a uniform inside diameter and not contacting with said projection, a diameter-expanded portion having a largest inside diameter and contacting with said projection, and a connecting portion with the inside diameter thereof changed gradually between said straight cylindrical portion and diameter-expanded portion, in which a difference in inside diameter between said diameter-expanded portion and straight cylindrical portion is 0.05 mm to 0.6 mm, and an end surface of said main body and that of said cylindrical body are apart from each other.

Furthermore, the second aspect of the invention is a process for manufacturing the ceramic joint body as mentioned above, which process comprises: making said ceramic member by means of a pressure sintering method; making said cylindrical body by sintering a cylindrical shaped body in the state that said projection is inserted in the cylindrical shaped body, applying a stress developed with firing shrinkage of said cylindrical body centripetally to said projection; and conducting the firing in such a manner that said projection has a relative density larger than the cylindrical body, and a difference in inside diameter between said diameter-expanded portion and straight cylindrical portion after firing is 0.05 mm to 0.6 mm.

The inventors have studied a method for strongly joining, for example, a member and a cylindrical body. In this course of study, the inventors have found that after forming a disclike member by means of a pressure sintering method, a projection is machined thereon, then in the state of the projection inserted inside the unfired cylindrical shaped body, the unfired body is heat-treated to manufacture a sintered cylindrical body.

BRIEF DESCRIPTION OF THE DRAWINGS

The above and other objects, features and advantages of the present invention will become more apparent from reading the following description of the preferred embodiments taken in connection with the accompanying drawings, wherein.

DESCRIPTION OF THE PREFERRED EMBODIMENTS

Figure 1:
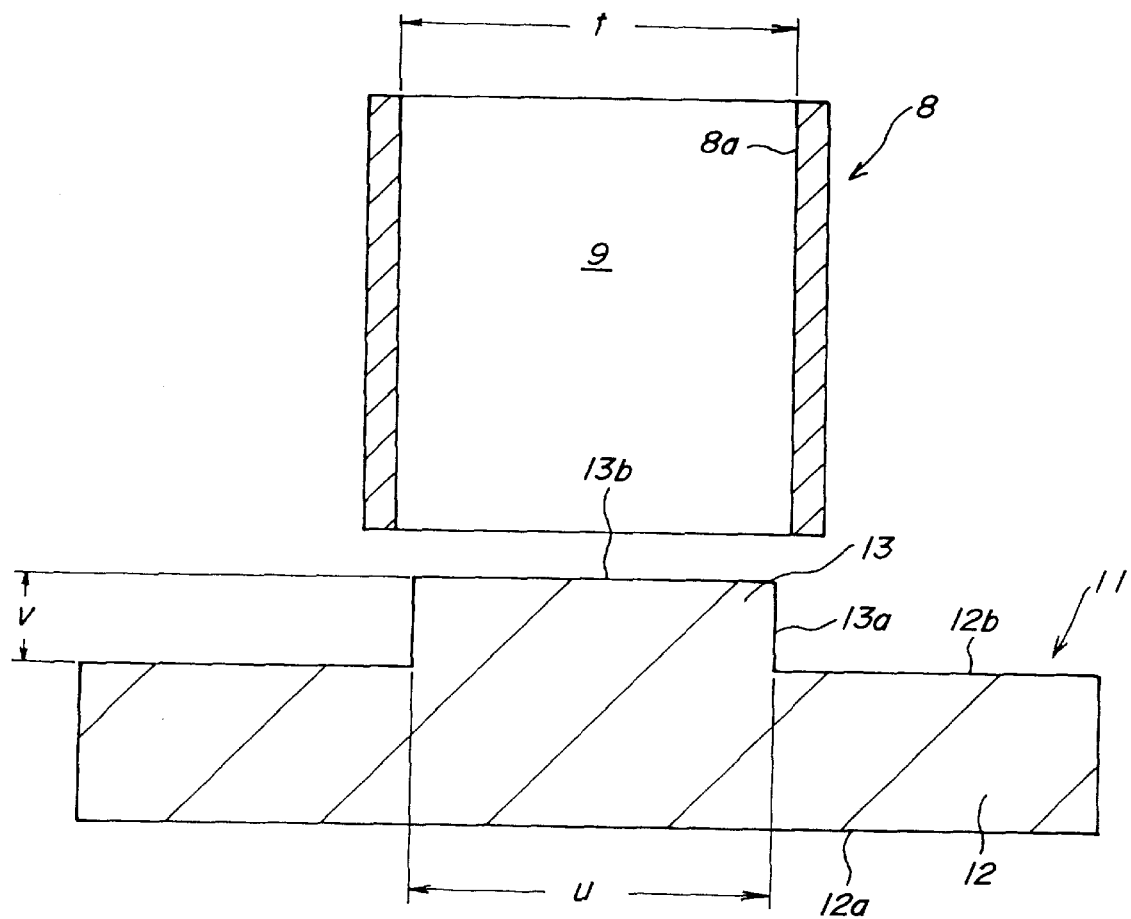
FIG. 1 is a vertical sectional view schematically illustrating the condition just before a disclike projection 13 is inserted into a cylindrical unfired body 8.

As shown in FIG. 1, an unfired cylindrical shaped body, preferably an unfired circular cylindrical unfired body 8 is prepared. An inner surface 8a of the unfired body 8 defines an inner space 9 thereof. A reference character t is an inside diameter of the unfired body 8.

A ceramic member 11 is made by means of a pressure sintering method. The ceramic member 11 is preferably provided with a disc-shaped main body 12 and a disclike projection 13 projected from one surface 12b of the main body 12. The other surface 12a of the main body 12 is flat. A reference character 13b is a principal surface of the disclike projection 13, a reference character u is an outside diameter of the disclike projection 13, and a reference character v is a height of the disclike projection 13 from the surface 12b of the main body 12.

At this stage, the sintering of the ceramic member 11 has been already completed and its relative density has sufficiently been increased. At this stage, the relative density is preferred to be not less than 99.5% and more preferably not less than 99.9%. An upper limit of the relative density is 100%.

On this condition, the disclike projection 13 is inserted into the inner space 9 of the unfired body 8 and a circumferential surface 13a of the disclike projection 13 is made to face the inner surface 8a of the unfired body 8. In this case, by making the inside diameter t of the unfired body 8 slightly larger than the outside diameter u of the disclike projection 13, a small clearance may be provided between the circumferential surface 13a and the inner surface 8a.

Figure 2:
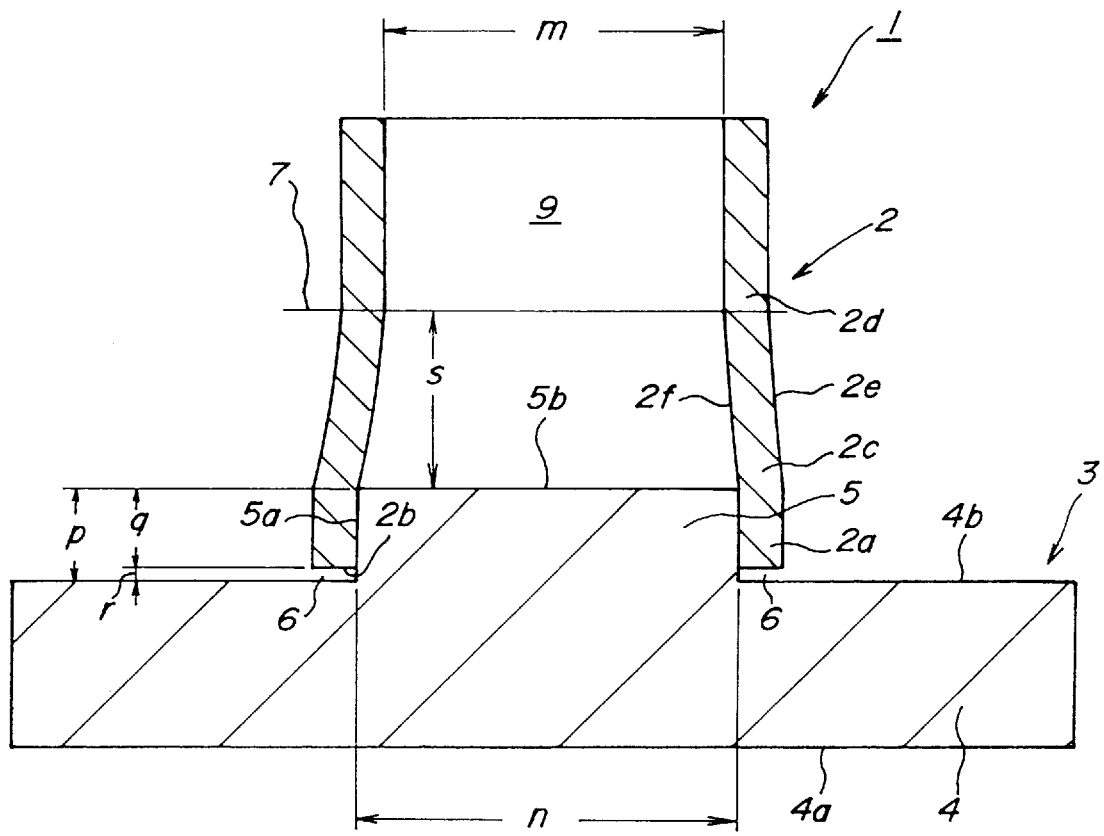
FIG. 2 is a vertical sectional view schematically illustrating a joint body according to one preferred embodiment of the present invention.

At this state, a heat treatment is conducted. The heat treatment is particularly preferred to be conducted at atmospheric pressure. Resultingly, the sintering of the unfired body 8 proceeds to provide a joint body as shown in FIG. 2. The joint body 1 shown in FIG. 2 comprises a cylindrical body 2 and a ceramic member 3. The ceramic member 3 comprises a disc-shaped main body 4 and a disclike projection 5 projected from one principal surface 4b of the main body 4. A reference character 4a is the other principal surface of the main body 4, a reference character 5b is a principal surface of the disclike projection 5, a reference character n is an outside diameter of the disclike projection 5, and a reference character p is a height of the disclike projection 5 from the surface 4b of the main body 4.

As the sintering of the unfired body 8 proceeds, a cylindrical body 2 is produced. At a portion of the cylindrical body 2 sufficiently apart from the disclike projection 5, since no pressure is applied from the disclike projection 5, a straight cylindrical portion 2d having a uniform inside diameter is formed. In this event, an inside diameter m of the straight portion 2d is made to be 0.05–0.6 mm smaller than the outside diameter n of the disclike projection 5. Additionally, a reference character 2e is an outer circumferential surface of the cylindrical body 2, and a reference character 2f is an inner circumferential surface of the cylindrical body 2.

On the other hand, in FIG. 1, at a portion of the unfired body 8 which faces the circumferential surface 13a of the disclike projection 13, in the course of firing shrinkage of the unfired body 8, the inner surface of the cylindrical body during firing shrinkage comes into contact with the circumferetial surface 5a of the disclike projection 5, whereby the shrinkage of the size is strongly restrained. Finally, as shown in FIG. 2, the circumferential surface 5a of the disclike projection 5 is firmly contacted with the diameter-expanded portion 2a of the cylindrical body 2. Namely, the diameter-expanded portion 2a pressurizes centripetally the disclike projection 5. By virtue of the pressure exerted from the circumferential surface 5a, the cylindrical body is fixed on the disclike projection 5. An inner shape of the diameter-expanded portion 2a is the same as the circumferential surface 5a.

At the same time, a tapered connecting portion 2c is formed between the straight portion 2d and the diameter-expanded portion 2a. The connecting portion 2c increases its inside diameter as it approaches the diameter-expanded portion 2a and decreases its inside diameter as it approaches the straight cylindrical portion 2d. An inner shape of the connecting portion 2c is preferably smoothly curved.

When a joint portion between the diameter-expanded portion 2a and the disclike projection 5 is subjected to heat cycles, a gap becomes liable to occur near an interface between the diameter-expanded portion 2a and the disclike projection 5. However, as aforementioned, by forming the tapered connecting portion 2c with its inside diameter gradually changed, an inner stress built up in the diameter-expanded portion 2a can be released.

At the stage of finishing firing the unfired body 8, it is necessary to increase the relative density of the disclike projection 5 than that of the cylindrical body 2. Thereby, it has been found that the disclike projection 5 can be prevented from cracking when the stress of shrinking due to firing the cylindrical body 2 acts continuously on the disclike projection 5.

In order to attain such a purpose, it is preferred that a difference in the relative density between the cylindrical body 2 and the disclike projection 5 is not less than 0.5%. Further, the relative density of the disclike projection 5 is preferred to be not less than 99.5%, more preferably not less than 99.9%. An upper limit of the relative density of the disclike projection 5 is 100%. On the other hand, by making the relative density of the cylindrical body 2 not less than 96%, the cylindrical body 2 can be effectively prevented from cracking at the stage of the heat treatment. From the viewpoint of preventing the disclike projection 5 from cracking, it is preferred that the relative density of the cylindrical body 2 is not more than 99%.

As pressure sintering methods to produce the ceramic member 11, a hot pressing method, a hot isostatic pressing method and the like are preferred. It is preferred that marked changes in sizes and physical properties do not occur between the ceramic member 11 before the heat treatment and the ceramic member 3 after the heat treatment. For this purpose, it is necessary that the ceramic member 11 has a sufficiently increased relative density after manufacturing the ceramic member 11.

Additionally, the temperature of the heat treatment for sintering the cylindrical body is determined depending on a relative density and an inside diameter dimension required for the cylindrical body 2. When the heat-treating temperature is not more than the pressure sintering temperature of the ceramic member 11, changes in the relative density, size and the like hardly occur, because the sintering of the ceramic member 3 does not proceed during the heat treatment. However, when the heat treating temperature is higher than the pressure sintering temperature of the ceramic member 11, the relative density of the ceramic member 3 may be increased and grain growth may proceed during the heat treatment.

As the result of the study on this point, the inventors have found that when the heat-treating temperature exceeds the pressure sintering temperature of the ceramic member 11 and a difference between the temperatures is more than 100° C. cracks are liable to be formed in the disclike projection 5, by virtue of the expansion of the disclike projection 5 due to grain growth during heat treatment. For this reason, it is preferred that a difference in the temperature between the heat treatment and the pressure sintering is not more than 100° C., more preferably not more than 50° C.

It is necessary that the inside diameter of the straight portion of the cylindrical body 2 after heat treatment is, as mentioned above, 0.05–0.6 mm smaller than the diameter of the disclike projection 5 after heat treatment. When it exceeds 0.6 mm, cracks become liable to be formed in the diameter-expanded portion 2a and gases are liable to leak after applying heat cycles. When it is less than 0.05 mm, a clearance is ready to form between the diameter-expanded portion 2a and disclike projection 5, so that gases are also liable to leak particularly after applying heat cycles.

Since the inside diameter of the straight cylindrical portion after heat treatment depends on inside and outside diameters of the cylindrical body before heat treatment, a relative density of the cylindrical body before heat treatment, a heat-treating temperature and a heat-treating time, these conditions must be decided so that above-mentioned requirements according to the present invention may be satisfied. Such settings of the conditions per se can be understood by those skilled in the art.

A thickness of the cylindrical body is preferred to be not more than 30 mm, because a pressure applied to the disclike projection from the cylindrical body tends to increase locally, when the thickness is too large. On the other hand, if the cylindrical body has a too small thickness, gas will be liable to leak due to shortage of the pressure between the cylindrical body and disclike projection, so that the thickness is preferred to be not less than 1 mm. The height v of the disclike projection is preferred to be as high as possible, usually preferably 5–20 mm.

In the present invention, as shown in FIG. 2, it is preferred that a clearance 6 is formed between the principal surface 4b of the main body 4 and the end surface 2b of the cylindrical body 2. At the stage before heat treatment, the end surface of the unfired body 8 is contacted with the main body 12. During heat treatment, the unfired body shrinks with firing, the diameter-expanded portion 2a also shrinks along longitudinal direction of the cylindrical body 2 and, therefore, a clearance 6 is formed. The clearance 6 may be intentionally provided.

In the case where the diameter-expanded portion 2a is directly contacted with the main body 4 and the joint portion is subjected to heat cycle, a stress is formed near the interface between the end surface 2b of the diameter-expanded portion 2a and the main body 4, and microcracks are liable to be formed. However, as mentioned above, by forming the clearance 6 between the principal surface 4b of the main body 4 and the end surface 2b of the cylindrical body 2, the formation of such a stress is prevented, and the joint portion is more stabilized against heat cycles.

In the present invention, the inventors have found it preferred that the ceramic member is made from the same kind of ceramics as the cylindrical body, but even when the kinds and amounts of the additives such as sintering aids etc. do not accord with each other, the joint structure having an extremely high resistance against heat cycles can be formed.

In the preferred embodiment according to the present invention, the ceramic member is applied to an apparatus for holding a semiconductor wafer to be exposed to corrosive gases and membrane forming gases. Additionally, in the apparatus metal members not exposed to these gases are embedded, and inside the cylindrical body metal members are exposed.

Examples of such members include: a ceramic heater comprising a ceramic main body and a resistance heating element embedded therein; a ceramic electrostatic chuck comprising a main body and an electrode for electrostatic chuck embedded therein; a heater with an electrostatic chuck which comprises a main body and a resistance heating element and electrode for electrostatic chuck embedded therein; and an active type apparatus, such as a high-frequency generating electrode apparatus comprising a main body and a plasma generating electrode embedded therein.

In this case, it is particularly preferred that the corrosive gas is halogenous gas and the ceramic member and the cylindrical body are made of aluminum nitride, because the corrosion resistance thereof against halogenous corrosive gas is made to be high. From the reason mentioned in the Description of Related Art, it is particularly difficult to join firmly the aluminum nitride members together, but in the present invention it has been attained.

A further material experimental result will be explained hereinafter.

(Experiment 1)

The joint body was manufactured according to the manner explained referring to FIG. 1 and FIG. 2. The mixture powder of yttrium oxide powder and aluminum nitride powder (yttrium oxide: 3% by weight) was shaped by means of the cold isostatic pressing method, and a cylindrical shaped body of the shape as shown in FIG. 1 was manufactured. The shaped body had an inside diameter t of 30 mm, an outside diameter of 40 mm, and a length of 100 mm. The pressure during shaping was made to be 0.8, 1.0, 1.2, 1.4, and 1.45 ton/cm$^2$, respectively. They correspond to Comparative Example 1, Example 1, 2 and 3, and Comparative Example 2, in Table 1, respectively. By heating these shaped bodies at a temperature of 500° C. for 5 hours, the shaping aids were removed.

The mixture powder of yttrium oxide powder and aluminum nitride powder (yttrium oxide: 3% by weight) was shaped by means of an axial press molding method at a pressure of 200 kg/cm$^2$, and a disc-shaped shaped body with a diameter of 200 mm and a thickness of 25 mm was obtained. The shaped body was fired by means of a hot pressing method at a temperature of 1850° C. under a pressure of 200 kg/cm$^2$ for 3 hours. The fired body was machined to form the disclike projection 13, and then the ceramic member 11 was provided. In this case, the disclike projection 13 had a height v of 10 mm, a diameter u thereof was 25 mm.

As mentioned above, the cylindrical unfired body 8 was arranged outside the circumferential surface 13a of the disclike projection 13, and heat-treated at a temperature of 1900° C. for 3 hours at atmospheric pressure, and a joint body as shown in FIG. 2 was obtained. The relative density of each cylindrical body 2 was 98.5%, and the relative density of each ceramic member 3 was 99.9%. A diameter m of the straight cylindrical portion 2 at a position 7 separated by a distance s (20 mm in the present invention) from the principal surface 5b of the disclike projection 5 is shown in Table 1. Also, measurements of a width r of the clearance 6 etc. are indicated in Table 1.

TABLE 1

| | Shaping pressure of cylindrical body (ton/cm$^2$) | Relative density of cylindrical body 2 (%) | Relative density of ceramic member 3 (%) | m (mm) | n (mm) | n − m (mm) | r (mm) | Amount of leakage (torr · l/sec.) |
|---|---|---|---|---|---|---|---|---|
| Comparative Example 1 | 0.8 | 98.5 | 99.9 | 24.33 | 25.00 | 0.67 | 2.3 | — |
| Example 1 | 1.0 | 98.5 | 99.9 | 24.64 | 25.00 | 0.36 | 1.2 | 9 × 10$^{-9}$ |
| Example 2 | 1.2 | 98.5 | 99.9 | 24.82 | 25.00 | 0.18 | 0.6 | 1.5 × 10$^{-9}$ |
| Example 3 | 1.4 | 98.5 | 99.9 | 24.95 | 25.00 | 0.05 | 0.3 | 2 × 10$^{-9}$ |
| Comparative Example 2 | 1.45 | 98.5 | 99.9 | 24.99 | 25.00 | 0.01 | 0 | 8 × 10$^{-4}$ |

The leak amounts were measured by means of helium leak detector made by Ulvac Co., Ltd., and shown in Table 1. From the results, in Comparative Example 1, cracks were formed in the cylindrical body and the leak amount could not be measured.

Further, with respect to Example 1, 2 and 3, and Comparative Example 2, the heat cycle test was conducted. Concretely, a process from room temperature to 600° C. is defined as one cycle, and 100 cycles were conducted. Then with respect to each example, the leak amounts were measured. As the results, a large change in leak amounts was not detected.

As mentioned above, the joint body according to the prevent invention showed a high airtightness after a severe heat cycle test.

As mentioned above, according to the present invention, there can be the provision of the joint structure which maintains a mechanical strength and an airtightness at a joint portion even subjected to heat cycles, particularly between high and low temperatures, and even for ceramics which are hardly wetted and jointed.

What is claimed is:

1. A ceramic joint body comprising a ceramic member composed of a main body and a projection projected therefrom and a ceramic cylindrical body, wherein the projection is inserted into the cylindrical body, said projection having a relative density larger than that of the cylindrical body, said cylindrical body comprising a straight cylindrical portion having a uniform inside diameter and not contacting with said projection, a diameter-expanded portion having a largest inside diameter and contacting with said projection, and a connecting portion with the inside diameter thereof changed gradually between said straight cylindrical portion and diameter-expanded portion, in which a difference in inside diameter between said diameter-expanded portion and straight cylindrical portion is 0.05 mm to 0.6 mm, and an end surface of said main body and a longitudinal end surface of said cylindrical body are spaced apart from each other.

* * * * *